(12) United States Patent
Nagayasu

(10) Patent No.: US 10,284,039 B2
(45) Date of Patent: May 7, 2019

(54) ROTOR OF ROTARY ELECTRIC MACHINE

(71) Applicant: MITSUBISHI ELECTRIC CORPORATION, Chiyoda-ku, Tokyo (JP)

(72) Inventor: Tetsuya Nagayasu, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 293 days.

(21) Appl. No.: 15/302,753

(22) PCT Filed: Jun. 3, 2014

(86) PCT No.: PCT/JP2014/064701
§ 371 (c)(1),
(2) Date: Oct. 7, 2016

(87) PCT Pub. No.: WO2015/186186
PCT Pub. Date: Dec. 10, 2015

(65) Prior Publication Data
US 2017/0033632 A1    Feb. 2, 2017

(51) Int. Cl.
*H02K 1/32*   (2006.01)
*H02K 3/24*   (2006.01)
(Continued)

(52) U.S. Cl.
CPC ............... *H02K 3/24* (2013.01); *H02K 1/32* (2013.01); *H02K 3/32* (2013.01); *H02K 9/08* (2013.01); *H02K 7/1823* (2013.01)

(58) Field of Classification Search
CPC ............ H02K 3/24; H02K 1/32; H02K 9/08
(Continued)

(56) References Cited

U.S. PATENT DOCUMENTS 5,685,063 A    11/1997  Prole et al.
6,459,180 B1*  10/2002  Mori .................. H02K 3/24
                                               174/15.6
(Continued)

FOREIGN PATENT DOCUMENTS

EP    2 302 767 A2    3/2011
JP    59-053060 A     3/1984
(Continued)

OTHER PUBLICATIONS

International Search Report (PCT/ISA/210) dated Sep. 2, 2014, by the Japanese Patent Office as the International Searching Authority for International Application No. PCT/JP2014/064701.
(Continued)

*Primary Examiner* — Jeremy A Luks
(74) *Attorney, Agent, or Firm* — Buchanan Ingersoll & Rooney PC

(57) ABSTRACT

In order to improve cooling performance of a rotor of a rotary electric machine, attention is paid to the relation between the secondary flow of a cooling gas generated inside ventilation holes for the cooling gas provided in a rotor winding formed by stacking a conductor and an interlayer insulating layer and the main flow of the cooling gas during the rotary motion of the rotor, and the secondary flow of the cooling gas is suppressed by changing the shape of bulges appearing in a linear shape in the stacked direction on an inner wall surface of each rotor winding ventilation hole on a negative pressure side.

4 Claims, 4 Drawing Sheets

(51) Int. Cl.
*H02K 9/08* (2006.01)
*H02K 3/32* (2006.01)
*H02K 7/18* (2006.01)

(58) Field of Classification Search
USPC .......................................................... 310/59
See application file for complete search history.

(56) References Cited

U.S. PATENT DOCUMENTS

| | | | | |
|---|---|---|---|---|
| 6,621,187 | B2 * | 9/2003 | Mori | .................. H02K 3/24 |
| | | | | 310/201 |
| 6,774,515 | B2 * | 8/2004 | Mori | .................. H02K 3/24 |
| | | | | 310/201 |
| 7,737,586 | B2 * | 6/2010 | Tounosu | .................. H02K 1/32 |
| | | | | 310/52 |
| 8,049,379 | B2 * | 11/2011 | Buskirk | .................. H02K 3/24 |
| | | | | 310/52 |
| 2002/0185921 | A1 | 12/2002 | Mori et al. | |
| 2002/0185923 | A1 | 12/2002 | Mori et al. | |
| 2010/0270876 | A1 | 10/2010 | Buskirk et al. | |

FOREIGN PATENT DOCUMENTS

| | | |
|---|---|---|
| JP | 10-285853 A | 10/1998 |
| JP | 2001-086679 A | 3/2001 |
| JP | 2010-259322 A | 11/2010 |

OTHER PUBLICATIONS

The extended European Search Report dated Dec. 15, 2017, by the European Patent Office in corresponding European Patent Application No. 14893918.4-1809. (8 pages).

\* cited by examiner

ROTOR OF ROTARY ELECTRIC MACHINE

TECHNICAL FIELD

The present invention relates to a rotor of a rotary electric machine used for a turbine power generator and so on. In particular, the present invention relates to improvement of ventilation and cooling performance of a rotor of a rotary electric machine.

BACKGROUND ART

In a rotor of a rotary electric machine, the heat generation amount of the rotor is increased and the temperature is increased when the output is increased, as a result, an insulation failure occurs. Accordingly, the increase of temperature is prevented by efficiently cooling conductors forming respective turns of a rotor winding to thereby allowing electric current to flow in the rotor winding as much as possible in order to obtain a higher output. That is, a ventilation hole for cooling penetrating respective conductors of the rotor winding in a stacked direction is provided, and a cooling gas such as air or hydrogen is allowed to flow in the ventilation hole directly for cooling the rotor winding (for example, Patent Document 1). Furthermore, in order to increase cooling efficiency by the cooling gas, rib-shaped projections parallel to an axial direction of the rotor are provided on a wall surface of the ventilation hole for the cooling gas and allowing the cooling gas flowing in a radial direction to be a turbulent flow state from a laminar flow state near the wall surface, thereby improving heat radiation performance in an inner wall of the ventilation hole for cooling (for example, Patent Document 2).

CITATION LIST

Patent Literature

[Patent Document 1] JP-A-59-53060
[Patent Document 2] JP-A-2001-86679

SUMMARY OF INVENTION

Technical Problem

However, in the related-art devices, ventilation resistance due to the turbulent flow and heat transfer characteristics have been just considered with respect to the main flow of the cooling gas connecting an entrance to an exit of the ventilation hole for cooling penetrating respective conductors of the rotor winding in the stacked direction.

The present invention proposes an efficient cooling structure by paying attention to the flow of the cooling gas during the rotary motion of a rotor and by considering the relation between the secondary flow of the cooling gas generated in the rotation state and the main flow of the cooling gas, and an object of the present invention is to obtain a rotor of a rotary electric machine which does not cause an insulation failure by further improving the cooling performance of the rotor of the rotary electric machine.

Solution to Problem

According to an embodiment of the present invention, there is provided a rotor of a rotary electric machine including channels provided in a rotor and allowing a cooling gas to flow in a rotation axis direction, and rotor winding ventilation holes communicating to the channels and provided in a rotor winding in which a conductor and an interlayer insulating layer are stacked so as to penetrate the conductor and the interlayer insulating layer in the stacked direction to allow the cooling gas to flow in a radial direction of rotation, in which the rotor winding ventilation hole is formed to have a cross-sectional shape in the rotating axis direction in which an inner wall surface on a negative pressure side is inclined from both end portions to the central portion and is not inclined at the central portion.

Advantageous Effects of Invention

According to the present invention, the rotor winding ventilation hole is formed to have a cross-sectional shape in the rotating axis direction in which an inner wall surface on a negative pressure side is inclined from both end portions to the central portion and is not inclined at the central portion in response to the main flow of the cooling gas in the radial direction and the secondary flow of the cooling gas in the axial direction generated by the rotary motion of the rotor, thereby suppressing the secondary flow on the surface of the ventilation hole on the negative pressure side and increasing the velocity of the cooling gas in the direction of the main flow, namely, the velocity of the flow in the radial direction, as a result, a temperature boundary layer on the surface of the rotor ventilation hole on the negative pressure side is reduced in thickness and heat transmission is promoted.

DESCRIPTION OF EMBODIMENTS

First Embodiment

A rotor of a rotary electric machine according to a first embodiment of the present invention will be explained with reference to FIG. 1, FIG. 2, FIG. 3 and FIG. 4.

Figure 1:
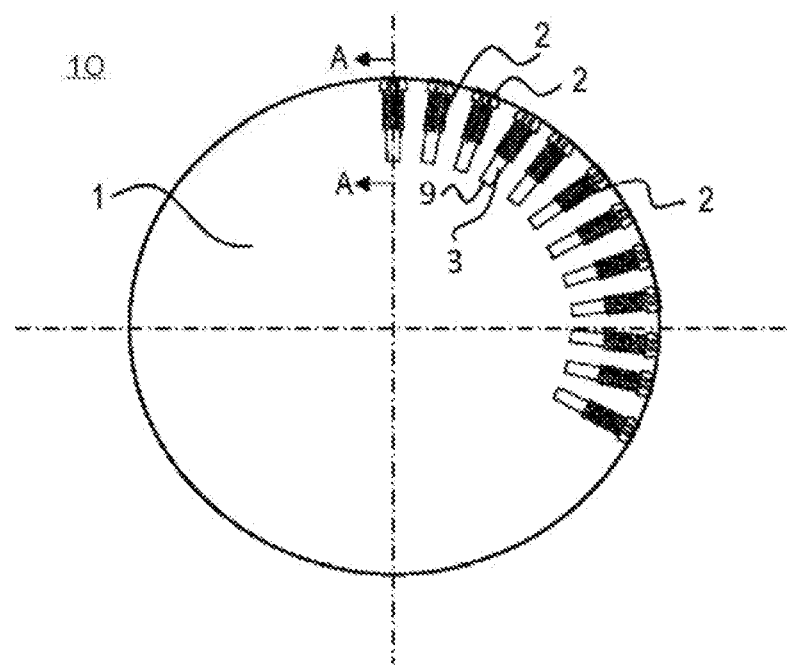
FIG. 1 is a cross sectional view of a rotor of a rotary electric machine.
Figure 2:
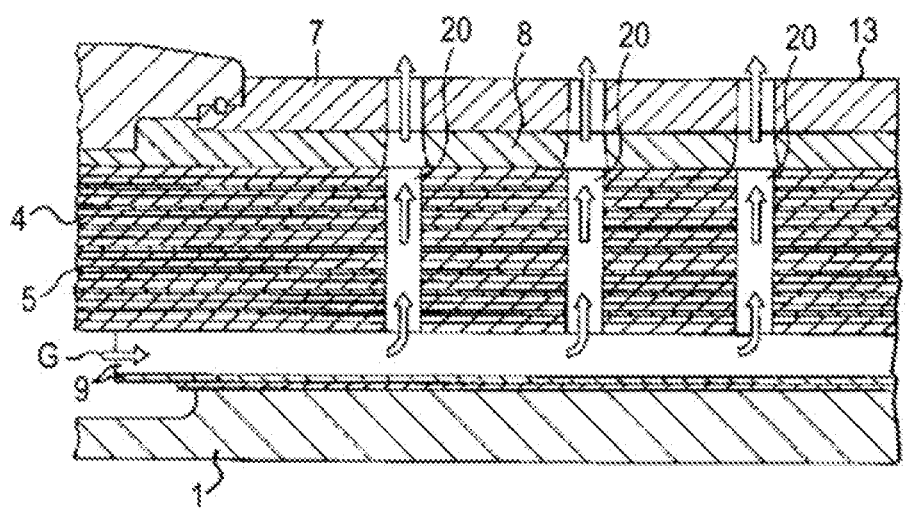
FIG. 2 is a cross-sectional view of a relevant part of the rotor cut along a surface passing an axial center of a rotor shaft of the rotary electric machine.
Figure 3:
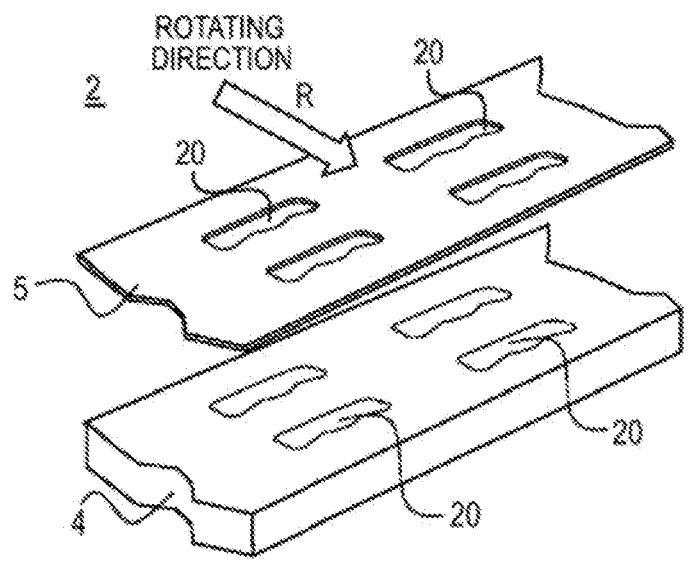
FIG. 3 is a partially broken perspective view showing a rotor winding according to a first embodiment of the present invention.
Figure 4:
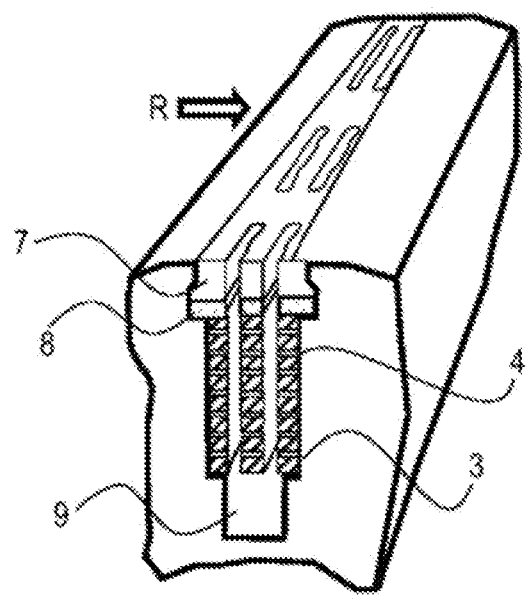
FIG. 4 is a perspective view showing a part taken from the rotor according to the first embodiment of the present invention.

FIG. 1 is a cross-sectional view of a rotor 10 of a rotary electric machine, FIG. 2 is a cross-sectional view of a relevant part of the rotor cut along a surface passing an axial center of a rotor shaft 1 in A-A line of FIG. 1 and FIG. 3 is a partially broken perspective view showing one layer of a rotor winding 2 used for the rotor 10 according to the invention. FIG. 4 is a perspective view showing a part taken from the rotor 10.

The rotor 10 is supported inside a stator (not shown) by a bearing (not shown), plural rotor grooves 3 are provided so as to surround the rotor shaft 1 in the rotor 10, and the rotor winding 2 is fixed inside the rotor grooves 3. The rotor winding 2 is formed by winding a conductor 4 having a rectangular cross section in a multilayer manner, and an interlayer insulating layer 5 is arranged between respective layers of the conductor 4 wound in the multilayer manner, thereby electrically insulating respective layers of the conductor 4.

A centrifugal force is generated in the rotor winding 2 when the rotor 10 rotates, but rotor wedges 7 support the rotor winding 2. Insulators 8 are provided between the rotor winding 2 and the rotor wedges 7.

Channels 9 are provided in the rotor 10. The channels 9 form passages provided in bottom portions of the rotor grooves 3 and allowing a cooling gas to flow in an axial direction.

In the rotor winding 2, rotor winding ventilation holes are provided, insulator ventilation holes coaxially provided with the rotor winding ventilation holes 20 are provided in the insulators 8, and rotor wedge ventilation holes are provided in the same manner in the rotor wedges 7. These rotor winding ventilation holes 20, the insulator ventilation holes and the rotor wedge ventilation holes are communicated in the radial direction to form radial direction ventilation holes. A clearance 13 indicates a gap between the rotor and the stator (not shown). An arrow G in FIG. 2 indicates the flow of the cooling gas.

Next, the operation of the rotor of the rotary electric machine will be explained. When a field current is applied to the rotor winding 2 from an external power supply (not shown), a magnetic field is generated in the rotor winding 2. When a rotating force from a turbine (not shown) and so on is transmitted to the rotor 10 in this state, the rotor 10 rotates with the rotor winding 2 at a fixed speed. Accordingly, the AC power is generated on the stator's side which is provided outside the rotor 10 by the rotor 10 rotating while generating a magnetic field in a prescribed direction.

When the field current is applied to the rotor winding 2 at that time, Joule loss is caused due to the electric resistance of the winding and heat is generated. Due to the heat generation, temperatures of the rotor winding 2 and respective insulators including the interlayer insulating layer 5 close to the rotor winding 2 are increased. When the temperatures of the rotor winding 2 and respective insulators are increased to be higher than a given temperature, an insulation function of them is deteriorated and prescribed insulation functions are lost, as a result, there is a danger that the rotor shaft 1 and the rotor winding 2 are electrically short-circuited and functions as the rotary electric machine are lost. Accordingly, in the rotor of the rotary electric machine, the rotor winding 2 is cooled by circulating a cooling gas in the respective rotor winding ventilation holes 20 through the channels 9.

The cooling gas is supplied to the channels 9 from an end of the rotor 10 in the axial direction, then, circulates inside the channels 9 in the axial direction of the rotor shaft 1 and is separated into respective ventilation holes in the radial direction provided at fixed intervals in the axial direction. Then, the cooling gas led to the respective rotor winding ventilation holes 20 circulates inside the rotor winding ventilation holes 20 in the radial direction while cooling the conductor 4 and the interlayer insulating layer 5 of the rotor winding 2 and circulates in the radial direction through the ventilation holes of the insulators 8 while cooling the insulators 8, after that, the cooling gas circulates in the radial direction through the ventilation holes of the rotor wedges 7 while cooling the rotor wedges 7 to be discharged to the clearance 13.

The temperature of the rotor winding 2 depends on the ventilation volume and the wind velocity of the cooling gas flowing in the radial direction ventilation holes, or the surface area of the rotor winding 2 contacting the cooling gas. These ventilation holes are generally arranged at equal intervals in the axial direction of the rotor shaft 1 in the rotor of the rotary electric machine, and the shape and the size of the rotor winding ventilation holes 20, the insulator ventilation holes and the rotor wedge ventilation holes forming the radial direction ventilation holes are formed to be the same.

As shown in FIG. 3, slits are provided in the conductor 4 and the interlayer insulating layer 5, and the rotor winding 2 is configured by stacking the conductor 4 and the interlayer insulating layer 5 so that the slits are communicated in the radial direction. The rotor winding ventilation holes 20 are formed in pairs at fixed intervals in the axial direction of the rotor shaft 1. The insulator ventilation holes and the rotor wedge ventilation holes are coaxially formed with the rotor winding ventilation holes 20 also in the insulators 8 and the rotor wedges 7. Then, the rotor winding ventilation holes 20, the insulator ventilation holes and the rotor wedge ventilation holes are provided so as to be communicated in the radial direction to form the radial direction ventilation holes.

The flow of the cooling gas inside the rotor winding ventilation holes 20 will be explained. The cooling gas is supplied to the channels 9 from the end of the rotor 10 in the axial direction. Then, the cooling gas circulates inside the channels 9 in the axial direction of the rotor shaft 1 and is separated into the rotor winding ventilation holes 20 provided at fixed intervals in the axial direction. The cooling gas led to the rotor winding ventilation holes 20 cools the rotor winding 2, then, circulates inside the insulator ventilation holes outward in the radial direction while cooling the insulators 8, after that, circulates insides the rotor wedge ventilation holes outward in the radial direction while cooling the rotor wedges 7 to be discharged to the clearance 13. At this time, Coriolis force acts on the fluid inside the rotor winding ventilation holes 20, therefore, the secondary flow from a negative pressure side to a positive pressure side occurs at the central portion inside the rotor winding ventilation hole 20. Accordingly, the velocity in the flowing direction is reduced on the negative pressure side in the central portion of the rotor winding ventilation hole 20, and a temperature boundary layer on the surface of the ventilation holes is increased in thickness, which deteriorates the heat transfer performance.

Figure 5:
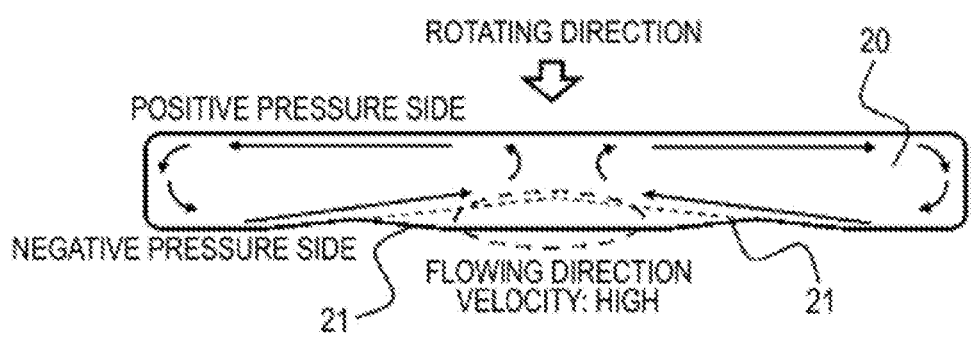
FIG. 5 is a plan view showing a cross-sectional shape of a ventilation hole of the rotor according to the first embodiment of the present invention.

FIG. 5 is a plan view of the rotor winding ventilation hole 20 in the rotor 10 of the rotary electric machine according to the first embodiment, which schematically shows a state of the second flow of the cooling gas in the rotary winding ventilation hole 20.

In the first embodiment, two linear bulges 21 extending in the direction of the main flow are formed symmetrically with respect to the center of an opening at an interval on the wall surface of the rotor winding ventilation hole 20 on the negative pressure side as shown in the drawing. As the secondary flow on the surface of the negative pressure side is suppressed due to the bulges 21 in an area surrounded by the bulges 21 according to the structure, the velocity of the flow of the cooling gas in the radial direction, namely, the velocity of the main flow direction is increased. Accordingly, the temperature boundary layer on the surface of the rotor winding ventilation holes 20 on the negative pressure side is reduced in thickness and heat transfer is promoted. Due to the improvement of the heat transfer performance, heat generation of the rotor winding 2 is efficiently removed and the temperature of the rotor winding 2 can be maintained to be low, which can suppress insulation deterioration of the insulators.

Figure 6:
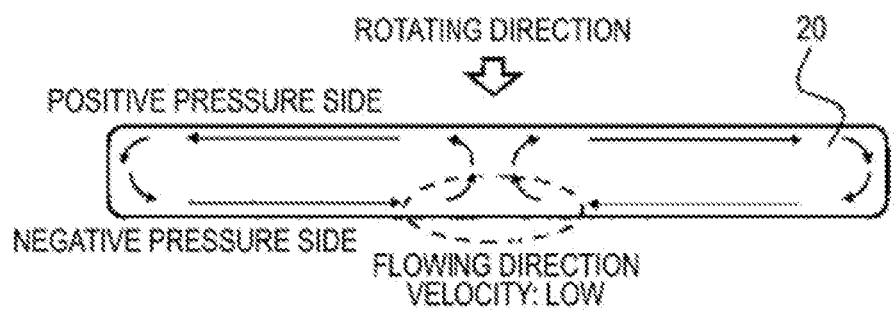
FIG. 6 is a plan view showing a cross-sectional shape of a related-art ventilation hole for comparison.

In contrast to the above, a comparative example is shown in FIG. 6. In the cooling gas led to the rotor winding ventilation hole 20 in the cross-sectional shape of the ventilation hole in related art, the secondary flow from the negative pressure side to the positive pressure side is generated at the central portion of the rotor winding ventilation hole 20. As the velocity of the flow direction of the main flow is accordingly reduced, which deteriorates the heat transfer performance.

In response to the above, the velocity of the secondary flow is reduced by forming the bulges 21 extending in the flow direction of the main flow at an interval on the negative pressure side of the surface of the ventilation hole 20 as shown in FIG. 5, and the velocity of the main flow in the flowing direction is not reduced. Accordingly, the cooling performance of the rotor winding 2 is improved, as a result, an insulation fault does not occur even when the output of the rotary electric machine is increased, which can prevent occurrence of a short-circuit accident between the rotary shaft 1 and the rotor winding 2.

In the above explanation, the ventilation hole through which the cooling gas flows is explained as the rotor winding ventilation hole 20 which is a component to which the present invention is applied, however, not only the rotor winding ventilation hole 20 but also the insulator ventilation hole and the rotor wedge ventilation hole can be targets. However, there is an industrial advantage by applying the present invention only to the rotor winding ventilation hole 20 in consideration of the labor of processing parts which form the rotor.

Although the two linear bulges 21 extending in the direction of the main flow which are formed symmetrically with respect to the center of the opening at an interval on the wall surface of the rotor winding ventilation hole 20 on the negative pressure side have been explained as an example, it is not always necessary to form the bulges at symmetrical positions. As long as bulges forma thin turbulent flow layer with respect to the secondary flow, the heat transfer efficiency can be optimized by arranging suitable bulged lines required by simulations of the flow of the cooling gas in the radial direction and the rotation speed of the rotor.

Second Embodiment

Figure 7:
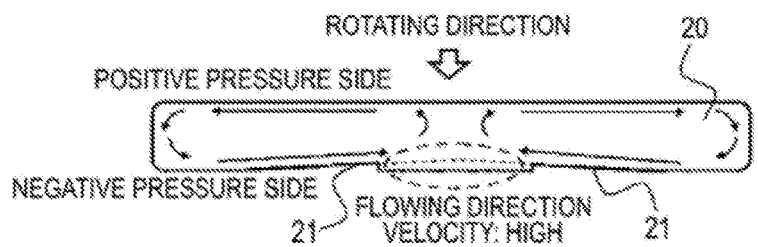
FIG. 7 is a plan view showing a cross-sectional shape of a ventilation hole of a rotor according to a second embodiment of the present invention.

FIG. 7 is a plan view showing a cross-sectional shape of a ventilation hole of the rotor according to a second embodiment of the present invention. When forming bulges on the inner wall surface of the rotor winding ventilation hole 20 on the negative pressure side, the bulges are formed to have an isosceles triangular shape in cross section having gentle slopes on both sides in FIG. 5, however, bulges may be formed to have a triangular shape in cross section having level differences as shown in FIG. 7. As the secondary flow is similarly suppressed in an area surrounded by the bulges, the same advantage can be obtained.

Third Embodiment

Figure 8:
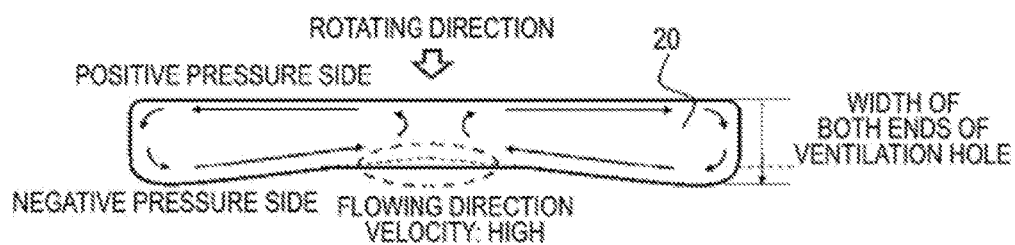
FIG. 8 is a plan view showing a cross-sectional shape of a ventilation hole of a rotor according to a third embodiment of the present invention.

FIG. 8 is a plan view showing a cross-sectional shape of a ventilation hole of the rotor according to a third embodiment of the present invention. The rotor winding ventilation hole 20 is formed to have a shape in which widths on both ends are enlarged to the negative pressure side to be larger than a width of the central portion. The rotor winding ventilation hole 20 is thus formed so that the inner wall surface of the rotor winding ventilation hole 20 on the negative pressure side is inclined from both end portions to the central portion and is not inclined at the central portion. That is, a slight change in shape is formed in a predetermined part of the inner wall surface, and the secondary flow at the central portion of the rotor winding ventilation hole 20 on the negative pressure side is suppressed by the changed part of the shape. Accordingly, the velocity in the flowing direction on the surface of the rotor ventilation hole on the negative pressure side, namely, the velocity in the radial direction is increased, therefore, the temperature boundary layer is reduced in thickness and the heat transfer is promoted. Accordingly, heat generation of the rotor winding 2 is efficiently removed and the temperature of the rotor winding 2 can be maintained to be low, which can suppress insulation deterioration of the insulators.

Fourth Embodiment

Figure 9:
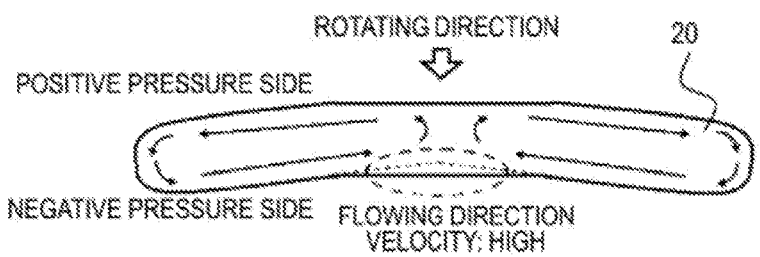
FIG. 9 is a plan view showing a cross-sectional shape of a ventilation hole of a rotor according to a fourth embodiment of the present invention.

FIG. 9 is a plan view showing a cross-sectional shape of a ventilation hole of the rotor according to a fourth embodiment of the present invention. Although the surface of the rotor winding ventilation hole 20 on the positive pressure side is perpendicular to the rotating direction in FIG. 8, an inner wall surface on the positive pressure side is made to be inclined in the same manner as the inner wall surface on the negative pressure side to be parallel to each other in the structure shown in FIG. 9. In an area where the inclination of the wall surface on the negative pressure side is changed, the secondary flow on the surface of the rotor winding ventilation hole 20 on the negative pressure side is suppressed with respect to the main flow of the cooling gas in the radial direction, therefore, the same advantage can be obtained.

Various modifications and alterations of this invention will be apparent to those skilled in the art without departing from the scope and spirit of this invention, and it should be understood that this is not limited to the illustrative embodiments set forth herein.

The invention claimed is:

1. A rotor of a rotary electric machine comprising:
channels provided in a rotor and allowing a cooling gas to flow in a rotation axis direction; and
rotor winding ventilation holes communicating to the channels and provided in a rotor winding in which a conductor and an interlayer insulating layer are stacked so as to penetrate the conductor and the interlayer insulating layer in the stacked direction to allow the cooling gas to flow in a radial direction of rotation,
wherein the rotor winding ventilation hole has a cross-sectional shape in the rotating axis direction in which an inner wall surface on a negative pressure side is inclined toward a positive pressure side, from both end portions to a central portion and is not inclined at the central portion.

2. The rotor of the rotary electric machine according to claim 1,
wherein the rotor winding ventilation hole is formed to have the cross-sectional shape in which widths of both end portions are enlarged to the negative pressure side to be larger than a width of the central portion.

3. The rotor of the rotary electric machine according to claim 1,
wherein the rotor winding ventilation hole is formed to have the cross-sectional shape in which an inner wall surface on a positive pressure side is inclined in the same manner as the inner wall surface on the negative pressure side to be parallel to each other.

4. A rotor of a rotary electric machine comprising:
channels provided in a rotor and allowing a cooling gas to flow in a rotation axis direction; and
rotor winding ventilation holes communicating to the channels and provided in a rotor winding in which a conductor and an interlayer insulating layer are stacked so as to penetrate the conductor and the interlayer insulating layer in the stacked direction to allow the cooling gas to flow in a radial direction of rotation,
wherein the rotor winding ventilation hole has a cross-sectional shape in the rotating axis direction in which an inner wall surface on a negative pressure side is inclined from both end portions to a central portion and is not inclined at the central portion,
wherein the rotor winding ventilation hole is formed to have the cross-sectional shape in which widths of both end portions are enlarged to the negative pressure side to be larger than a width of the central portion.

\* \* \* \* \*